(12) United States Patent
Dugan et al.

(10) Patent No.: US 7,609,643 B2
(45) Date of Patent: Oct. 27, 2009

(54) TRANSFER OF ERROR-ANALYSIS AND STATISTICAL DATA AFTER RETRY IN A FIBRE CHANNEL INPUT/OUTPUT SYSTEM

(75) Inventors: Robert J. Dugan, Hyde Park, NY (US); John R. Flanagan, Poughkeepsie, NY (US); Giles R. Frazier, Austin, TX (US); Matthew J. Kalos, Tucson, AZ (US); Louis W. Ricci, Hyde Park, NY (US); Kenneth M Trowell, Terry Hills (AU); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 11/869,173

(22) Filed: Oct. 9, 2007

(65) Prior Publication Data

US 2008/0034250 A1  Feb. 7, 2008

Related U.S. Application Data

(63) Continuation of application No. 10/388,643, filed on Mar. 3, 2003, now Pat. No. 7,324,455.

(51) Int. Cl.
*H04L 12/26* (2006.01)
(52) U.S. Cl. .................................. 370/248; 714/57
(58) Field of Classification Search .......... 370/241, 370/248, 250; 714/57
See application file for complete search history.

(56) References Cited

U.S. PATENT DOCUMENTS

| | | |
|---|---|---|
| 5,392,425 A | 2/1995 | Elliott et al. |
| 5,422,893 A | 6/1995 | Gregg et al. |
| 5,455,830 A | 10/1995 | Gregg et al. |
| 5,490,153 A | 2/1996 | Gregg et al. |

(Continued)

FOREIGN PATENT DOCUMENTS

EP   0439693 A2   8/1991

(Continued)

OTHER PUBLICATIONS

NCITS 349-2000, Fibre Channel Single-Byte Command Code Sets-2 (FC-SB-2) (NPL was submitted with U.S. Appl. No. 10/388,643), Dec. 6, 2000.

(Continued)

*Primary Examiner*—Melvin Marcelo
(74) *Attorney, Agent, or Firm*—John E. Campbell

(57) ABSTRACT

A computer Input/Output system having a fabric, a control unit (CU) and a host computes including a channel, the channel having a channel port connected by a first link to a channel neighbor port of the fabric, and the control unit having a CU port connected by a second link to a CU neighbor port on the fabric. When an error is detected in the link or protocol between the channel and the control unit, after a retry of the failing operation is performed, error data are reported to the channel by the channel, the channel port, the channel neighbor port, the control unit, the CU port and the CU neighbor port and sent to the channel. The error data are provided to the host computer for analysis.

18 Claims, 6 Drawing Sheets

U.S. PATENT DOCUMENTS

| | | |
|---|---|---|
| 6,148,421 A | 11/2000 | Hoese et al. |
| 6,188,668 B1 | 2/2001 | Brewer et al. |
| 6,201,787 B1 | 3/2001 | Baldwin et al. |
| 6,233,073 B1 | 5/2001 | Bowers et al. |
| 6,490,253 B1 | 12/2002 | Miller et al. |
| 6,492,425 B1 | 12/2002 | Callahan et al. |
| 6,499,066 B1 | 12/2002 | Frazier |
| 2003/0137934 A1 | 7/2003 | Schaller et al. |

FOREIGN PATENT DOCUMENTS

| | | |
|---|---|---|
| EP | 0529220 A1 | 3/1993 |
| EP | 0576136 A2 | 12/1993 |
| JP | 63161603 | 1/1990 |
| WO | WO0040981 | 7/2000 |
| WO | WO0130007 | 4/2001 |
| WO | WO0195565 | 12/2001 |

OTHER PUBLICATIONS

ANSI NCITS Project 1331-D, Fibre Channel-Framing and Signaling (FC-FS) (NPL was submitted with U.S. Appl. No. 10/388,643), 2000-2003.

| STEP | CHANNEL PROCEDURES | CONTROL UNIT PROCEDURES |
|---|---|---|
| 1 | ERROR OCCURS. | ERROR OCCURS. |
| 2 | LINK-LEVEL RECOVERY OCCURS. | LINK-LEVEL RECOVERY OCCURS. |
| 3 | SEND PURGE PATH EXTENDED (PPE) FUNCTION TO CONTROL UNIT WITH ERROR DATA, INCLUDING A REASON CODE. SEND READ LINK STATUS (RLS) TO NEIGHBOR F_PORT TO ACQUIRE LESB. | |
| 4 | | RECEIVE PPE REQUEST. IF NOT SUPPORTED, REGARD AS A PURGE PATH (PP) REQUEST. IF SUPPORTED, STORE LOCAL ERROR DATA AND ERROR DATA RECEIVED IN PPE REQUEST FOR ANALYSIS PERSONNEL. SEND RLS TO NEIGHBOR F_PORT TO ACQUIRE LESB. |
| 5 | | IF PPE SUPPORTED, SEND PPE RESPONSE TO CHANNEL, IF NOT, SEND PP RESPONSE TO CHANNEL. |
| 6 | RECEIVE PP OR PPE RESPONSE | |
| 7 | IF PP RESPONSE, INTERRUPT SYSTEM WITH LOCAL ERROR DATA. IF PPE RESPONSE, INTERRUPT SYSTEM WITH LOCAL ERROR DATA & ERROR DATA RECEIVED IN PPE, IF ANY. | |

FIG.2

FIG.3
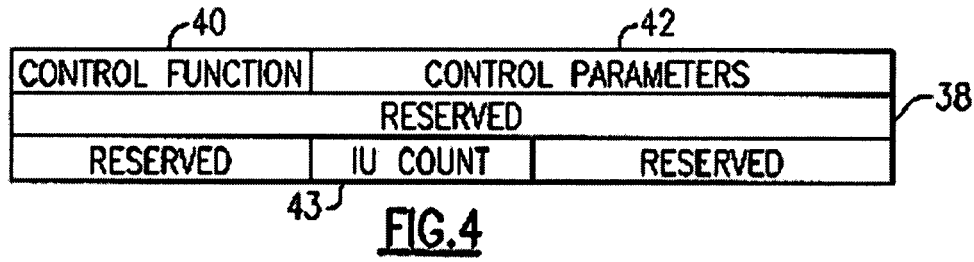
FIG.4
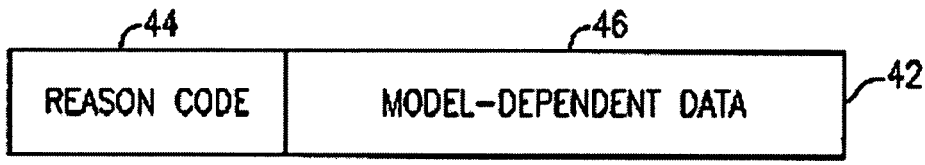
FIG.5
| CODE (HEX) | MEANING |
|---|---|
| 00 | RESERVED |
| 01 | SB-3 PROTOCOL TIMEOUT |
| 02 | SB-3 LINK FAILURE |
| 03 | RESERVED |
| 04 | SB-3 OFFLINE CONDITION |
| 05 | FC-PH LINK FAILURE |
| 06 | SB-3 LENGTH ERROR |
| 07 | LRC ERROR |
| 08 | SB-3 CRC ERROR |
| 09 | IU COUNT ERROR |
| 0A | SB-3 LINK-LEVEL PROTOCOL ERROR |
| 0B | SB-3 DEVICE-LEVEL PROTOCOL ERROR |
| 0C | RECEIVE ABTS |
| 0D | CANCEL FUNCTION TIMEOUT |
| 0E | ABNORMAL TERMINATION OF EXCHANGE |
| 0F-FF | RESERVED |
FIG.6

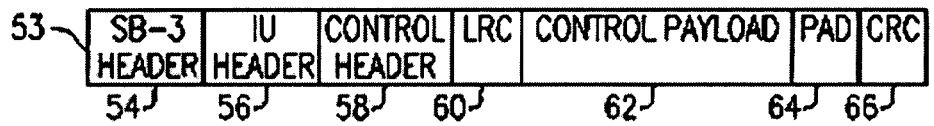

FIG.7

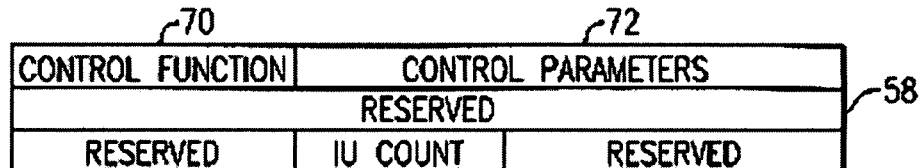

FIG.8

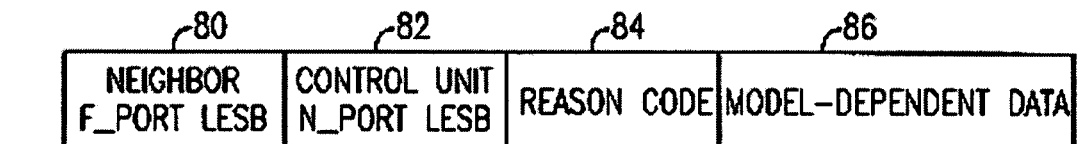

FIG.9

| CODE (HEX) | MEANING |
|---|---|
| 00 | NO ERROR RECOGNIZED |
| 01 | SB-3 PROTOCOL TIMEOUT |
| 02 | SB-3 LINK FAILURE |
| 03 | LOGICAL PATH TIMEOUT ERROR |
| 04 | SB-3 OFFLINE CONDITION |
| 05 | FC-PH LINK FAILURE |
| 06 | SB-3 LENGTH ERROR |
| 07 | LRC ERROR |
| 08 | SB-3 CRC ERROR |
| 09 | IU COUNT ERROR |
| 0A | SB-3 LINK-LEVEL PROTOCOL ERROR |
| 0B | SB-3 DEVICE-LEVEL PROTOCOL ERROR |
| 0C | RECEIVE ABTS |
| 0D | RESERVED |
| 0E | ABNORMAL TERMINATION OF EXCHANGE |
| 0F | LOGICAL PATH NOT ESTABLISHED |
| 10 | TEST INITIALIZATION RESULT ERROR |
| 11-FF | RESERVED |

TRANSFER OF ERROR-ANALYSIS AND STATISTICAL DATA AFTER RETRY IN A FIBRE CHANNEL INPUT/OUTPUT SYSTEM

CROSS-REFERENCE TO RELATED APPLICATION

This is a continuation of U.S. patent application Ser. No. 10/388,643 Filed Mar. 3, 2003 now U.S. Pat. No. 7,324,455 "TRANSFER OF ERROR ANALYSIS AND STATISTICAL DATA IN A FIBRE CHANNEL INPUT/OUTPUT SYSTEM" which is assigned to the same assignee as this application and is hereby incorporated herein by reference in its entirety.

BACKGROUND OF THE INVENTION

The field of the present invention is the extension of an error-recovery function of a Fibre Channel Single-Byte system so that it can transfer diagnostic and statistical information sampled at the time of an error in the system.

In fibre channel networks, especially those Fibre Channel Single-Byte networks, data available to field personnel sent to analyze network problems is insufficient. Analysis of these problems has shown that the required error data is often available, but it cannot be accessed and provided to field personnel. For example, error data required to diagnose channel problems often exists only at the control unit, and it cannot be acquired and displayed at the channel. Similarly, data required to diagnose control unit problems often exists only at the channel, and it cannot be acquired and displayed at the control unit. The IBM version of the Fibre Channel Single-Byte system is available from IBM as the FICON network, and is further described in the following standards documents:

1. NCITS 349-2000, *Fibre Channel Single-Byte Contend Code Sets*-2 (*FC-SB*-2)
2. ANSI NCITS Project 1331-D, *Fibre Channel-Framing and Signaling* (*FC-FS*)

BRIEF SUMMARY OF THE INVENTION

The present invention provides a method of accumulating and transferring error data including statistics from the channel to the control unit and vice versa, thereby providing a complete set of the error data to channel field personnel and a set of error data for the control unit field personnel. This facilitates rapid diagnosis of field problems, and results in significant warranty cost savings.

It is an object of the present invention to accumulate and transfer error and statistical information at the time of an error in the network.

It is a further object of the invention to extend the FICON Purge Path error-recovery function so it transfers error-related data including statistics between a control unit and channel in the network. The extensions made are compatible with preexisting FICON implementations, and require only minor enhancements to the current FICON error-recovery procedures.

It is another object of the present invention to provide a process whereby two communicating N_ports acquire error statistics from their neighboring F_ports upon the occurrence of an error.

It is another object of the present invention to send statistics, along with other error-analysis data from one of the communicating N_Ports to the other N_Port as a part of normal error recovery.

It is a further object of the present invention to present statistics to diagnostic personnel for problem analysis.

It is a further object of the present invention to provide upward-compatible extensions of the FICON Purge Path (PP) request and response functions to enable the transfer of these and other error statistics between a channel and a control unit.

It is also an object of the present invention to provide extensions to FICON error recovery procedures to require the transfer of error-analysis data as a normal part of error recovery.

BRIEF DESCRIPTION OF THE SEVERAL VIEWS OF THE DRAWING

These and other objects will be apparent to one skilled in the art from the following detailed description of the invention taken in conjunction with the accompanying drawings.

FIG. 2 is table showing the flow of the PPE facility of FIG. 1.

FIG. 3 is a diagram showing the PPE request frame transmitted by the PPE facility.

FIG. 4 is a diagram showing the control header of the PPE request of FIG. 3.

FIG. 5 is a diagram showing control parameters of the control header of FIG. 4.

FIG. 6 is a table showing the reason codes used in the control parameters field of FIG. 5 in the PPE request.

FIG. 7 is a diagram showing a PPE response frame transmitted in response to the PPE request frame of FIG. 3.

FIG. 8 is a diagram of the control header field of the PPE response frame of FIG. 7.

FIG. 9 is a diagram of the control payload field of the PPE response of FIG. 7.

FIG. 10 is a table showing the response codes used the control parameters of FIG. 9 in the PPE response.

DETAILED DESCRIPTION OF THE INVENTION

Figure 1:
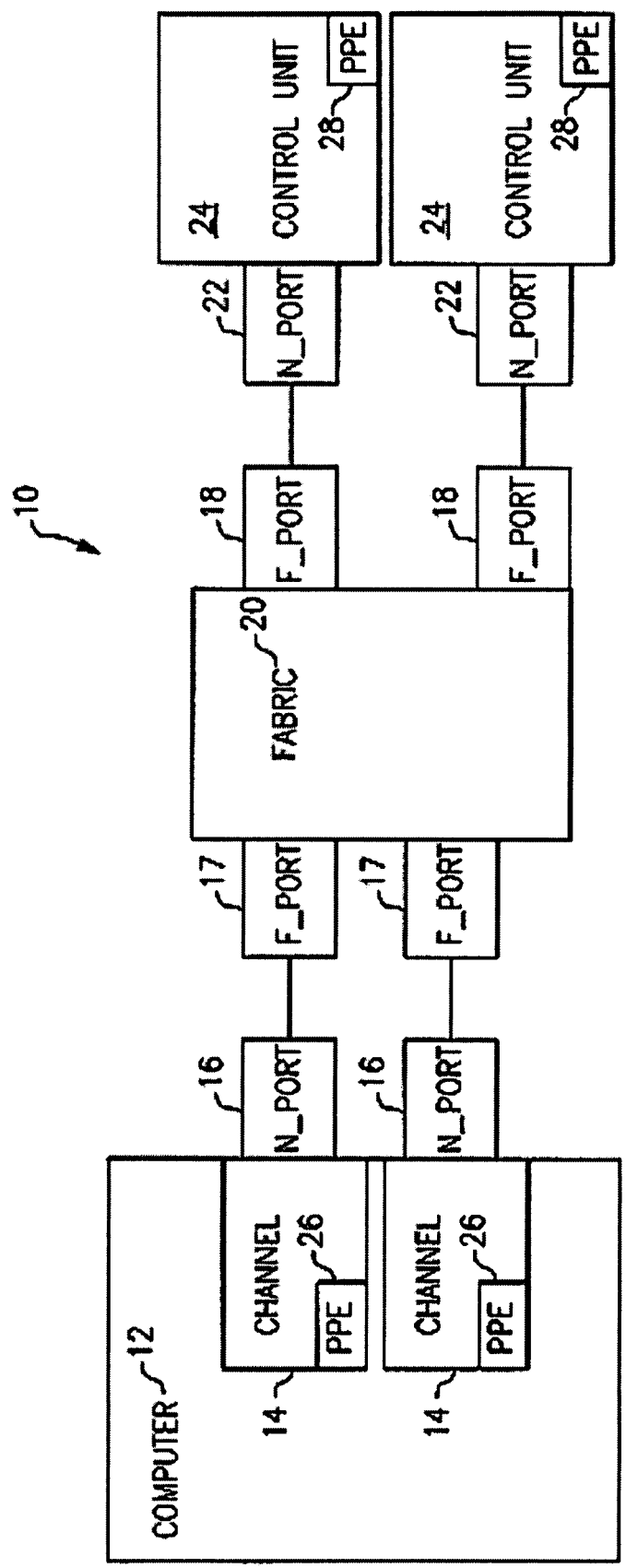
FIG. 1 is a schematic diagram of a computer Input/Output (I/O) system having a computers including channels, a fabric, and Control Units (CU), each of the channels and CUs including a Purge Path Extended (PPE) facility of the present invention.

FIG. 1 is a schematic diagram showing a computer I/O system 10 including a computer 12 having channels 14 each having N_Ports 16. AS is well known, the N_Ports 16 of the channels 14 are connected to F_Ports 17 of a fabric 20. The fabric 20 may be switches or other fibre channel directors, which are well known. Other F_Ports 18 of the fabric are connected to N_Ports 22 of Control Units (CU) 24. The computer may be an IBM eServer zSeries 900 computer system, or any other of the computer systems which use channels and operate under the Fiber Channel standards mentioned above. In the present invention, the channels 14 contain Purge Path Extended (PPE) facilities 26, and the Control Units 22 include PPE facilities 28.

As is well known, during the initialization of the I/O system 10, the channels 14 and control units 24 establish the identity of their nearest neighbors. This process is fully explained in Reference 2 above and disclosed in U.S. Pat. No. 5,371,897 issued Dec. 6, 1994 to Brown et al.

FIG. 2 is a table which forms a logic diagram of the operation of the PPEs 26 of the channels 14 and the PPEs 28 of the Control Units 24 of FIG. 1. The steps of the operation are shown in column 30, the procedures of the PPEs 26 are shown in column 32, and the procedures of the PPEs 28 are shown in column 33. At step 1, an error occurs between the channel 14 and the control unit 24. Recovery of the error results in an exchange of data being aborted. Errors which might cause recovery are well known by those skilled in Fibre Channel Physical and Signaling (FC-PH) standards and may include Single Byte Command 2 (SB-2) link failure, Logical path timeout error, SB-2 offline conditions, FC-PH link failure, SB-2 exchange error Logical-path-not-established error, a Port_Reject (P_RJT) or Frame_Reject (F_RJT) (Classes 1 and 2). SB-2 link-level reject, and Test-initialization-result error. Since these errors are well known, they will not be discussed further. At step 2, link-level recovery occurs, which is also well known and discussed, for instance, in reference above.

After completing link-level recovery, the PPE facility 26 of the channel 14 sends a Purge Path Extended (PPE) request to the control unit 24. The channel 14 also sends the Read Link Status (RLS) FC-PH Extended Link-control function to its attached F_Port 16 to acquire error statistics by sending a Read Link Error Status Block (RLS) request to its neighbor F_Port 16 who returns a Link Error Status Block (LESB), as is well known.

The PPE request is shown in FIG. 3 and includes a Single Byte-3 header 34, an information unit (IU) header 36, and control header 38, and a Longitudinal Redundancy Check (LRC) field 40 to provide error detection. The contents of these fields are well understood and explained in reference 1 above.

FIG. 4 shows the contents of the control header 3B of FIG. 3. The control header 38 includes a control function field 40, control parameters 42, and an IU count field 43. FIG. 5 shows the contents of the control parameters 42 of the control header 38 of FIG. 4. In a basic Purge Path (PP) function, the control parameter field 42 is all zeros. The control parameters 42 include a reason code 44 which gives the reason for the error detected at step 1, and may include model-dependent data 46 which further describes the error, which may be supplied by the channels or ports, as desired. Code zero of the reason code 44 is reserved in order to ensure that the control parameters field 42 is non-zero, thereby enabling the control unit 24 to distinguish the PPE request from the basic PP function. FIG. 6 is a table showing the possible reason codes in column 50 which may be used in the reason code field 44 of the control parameters 42. Column 52 gives definitions of the reason codes 50.

Returning to FIG. 2, at step 4, the control unit 24 receives the PPE request. If the PPE facility 28 of the control unit 24 is not supported, then the control unit ignores the control parameter field 42 and regards the PPE request as a PP request. If PPE is supported, then the control unit 24 regards the request as a PPE request. Also, if PPE is supported and if the control unit 24 is attached to a fabric, the control units sends an RLS request to the neighbor F_Port 18 to acquire error statistics contained in the LESB, as previously explained. The control unit 24 subsequently logs these statistics, along with the reason code received in field 44 of the PPE request from the channel, and other model-dependent data in field 46 for use by the control unit service personnel. It will be understood that the present invention may also be used in a point-to-point configuration when no fabric is included and a channel is connected directly to a control unit. If the control unit 24 is directly attached to the channel 14, a PPE request is sent directly to the attached control unit 24 and no neighbor F_Port LESB is obtained by either the channel 14 or the control unit 24, and the neighbor F_Port LESB field is set to zero.

In step 5, if the control unit 24 does not support PPE, it responds to the PPE request with a PP response. If PPE is supported, the control unit sends the PPE response to the channel 14. The format of the PPE response 53 is shown in FIG. 7 and contains an SB-3 header 54, an IU header 56 a control header 58 and an LRC field 60, much like the PPE request of FIG. 3. The PPE response also includes a control payload 62, a pad 64 as needed to make the length of the PPE response of the correct length, and a Cyclic Redundancy Check (CRC) field 66, as is well known to provide error checking. It will be understood that the control payload field 62 is used to transfer error-related data and statistics from the control unit 24 to the channel 12.

FIG. 8 shows the contents of the control header field 58 of FIG. 7. The control header 58 contains a control function field 70, control parameters 72, and IU count 74 and a control payload byte count 76. The control function 70 and IU count 74 are the same as those in a PP response, which is well understood and explained in reference 1. The control parameters field 72 is reserved. The control payload byte count 76 contains a binary value representing the length in bytes of the control payload field 62. FIG. 9 shows the format of the control payload field 62 of FIG. 7. The control payload field 62 includes the F_Port LESB field 80 of the control unit P_Port 18, the N_Port LESB field 82 of the control unit N_Port 22, a reason code 84 for the error seen by the control unit 24, and model-dependent data 86 collected by the control unit 24, as desired. FIG. 10 is a table 89 of the reason codes 90 and their meanings 92 as determined by the control unit 24. It will be seen that the reason codes 90 of FIG. 10 are different than the reason codes 50 of FIG. 6, since the reason for the error as seen by the control unit 24 my be different than the reason for the error as seen by the channel 14.

At step 6, the channel receives the PP or PPE response sent by the control unit 24 in response to the PPE request of FIG. 3. If the channel 14 supports the PPE facility 26, the channel 14 stores the following information:

Channel F_Port LESB;
Channel N_Port LESB;
Channel error reason code 44;
Model-dependent channel error data 46;
Control unit neighbor F_Port LESB 80 (only if received in PPE response);
Control unit N_Port LESB 82 (only if received in PPE response;
Control unit error reason code 84 (only if received in PPE response; and
Control unit model-dependent data 86 (only if received in PPE response.

At step 7, if there is no PP response, interrupt the system 12 with local error data. If there is a PPE response, interrupt the system 12 with local error data and error data received in the PPE response, if any. After receipt of the PP response or the PPE response, the channel 14 may retry the I/O operation. When the final interruption is given for the I/O operation (possibly after retries by the channel 14), the host computer 12 is interrupted, and the above information stored in the channel 14 is made available at the host 12. The host 12 may then log the data and make it available for use by channel maintenance personnel.

Figure 11:
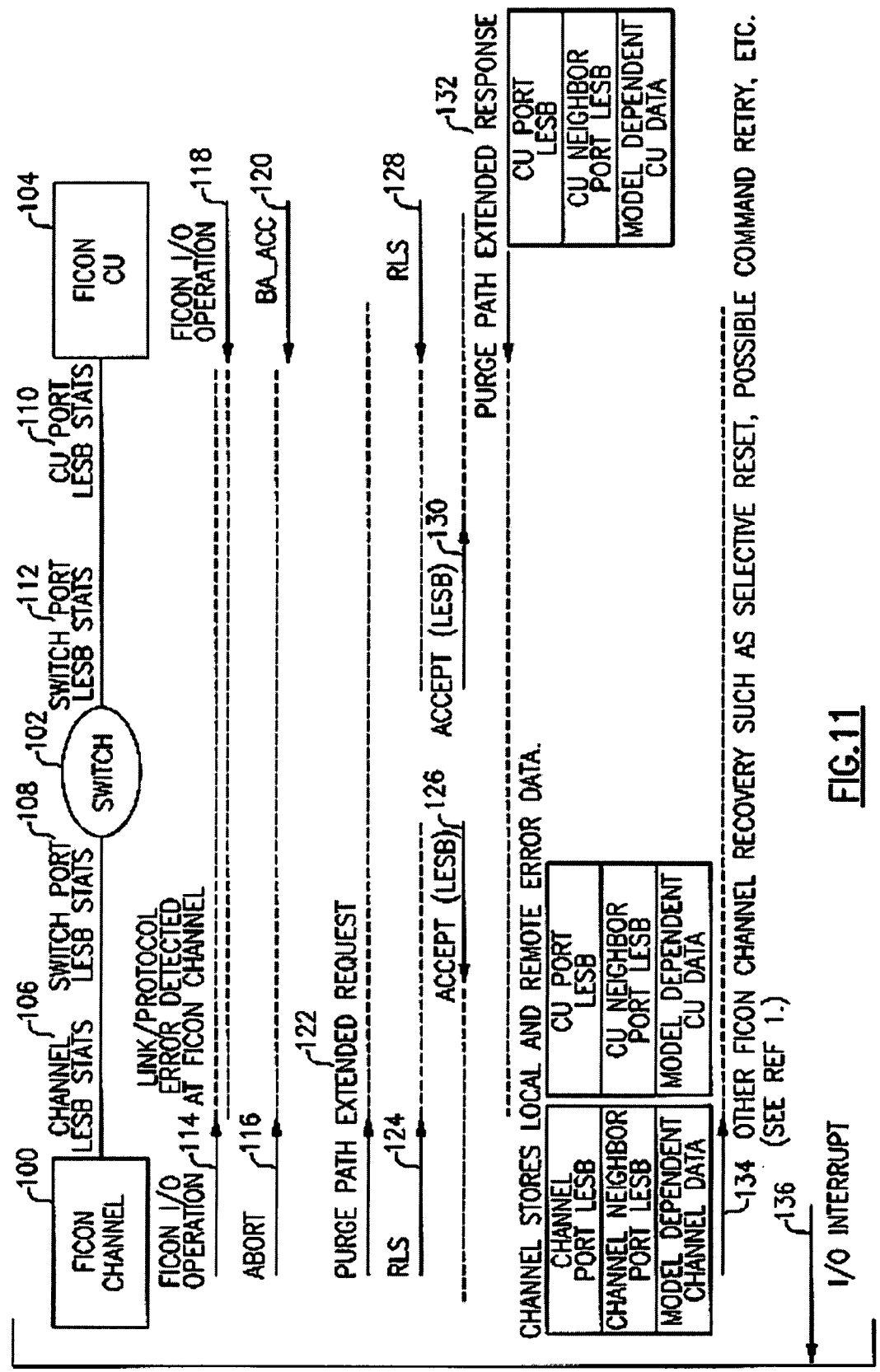
FIG. 11 is a diagram showing the operation of one embodiment of the Purge Path Extended facility for a link/protocol error detected at an IBM FICON channel.

FIG. 11 is a schematic and logic flow diagram of an IBM I/O system of the IBM FICON architecture which is the IBM embodiment of the Fibre Channel Single-Byte Command Code sets-2 (FC-SB-2) standards of Reference 1. In FIG. 11, a FICON channel 100 is connected to a switch 102, which is connected to a FICON control unit 104. Upon an error, channel error statistics are kept in a channel Link Error Status Block 106 and a Switch Port LESB 108. Control Unit error statistics are similarly kept in a CU Port LESB 110 and a Switch Port LESB 112. During a FICON I/O operation represented at 114, a link/protocol error is detected at the FICON channel 100. Upon detecting the error, an Abort 116 is sent to the CU 104. The FICON I/O operation 118 is aborted, and a Basic Accept (BA_ACC) 12D is sent to the FICON channel 100, which is the well known reply to the Abort 116. The FICON channel 100 then sends a Purge Path Extended (PPE) request 122, as has been described. The channel then sends an RLS 124 to receive the channel switch port LESB statistics 106 at 126. Likewise, the CU 104 sends an RLS 128 to receive the CU switch port LESB statistics 112 at 130. The CU 104 assembles the CU port LESB 110, the CU neighbor port LESB 112 and any model-dependent CU data and sends it to the channel 100 via a PPE response 132, as has been described. At 133, the channel 100 then stores the channel port LESB 106, the Channel neighbor port LESB 108 and model-dependent channel data, along with the data received from the PPE response 132. The FICON channel 100 then performs other FICON channel recovery 134 such as Selective Reset, and possible command retry, etc. After recovery the channel 100 sends an I/O interrupt 136 to the host system to make the transfer error and statistical information available to the host.

Figure 12:
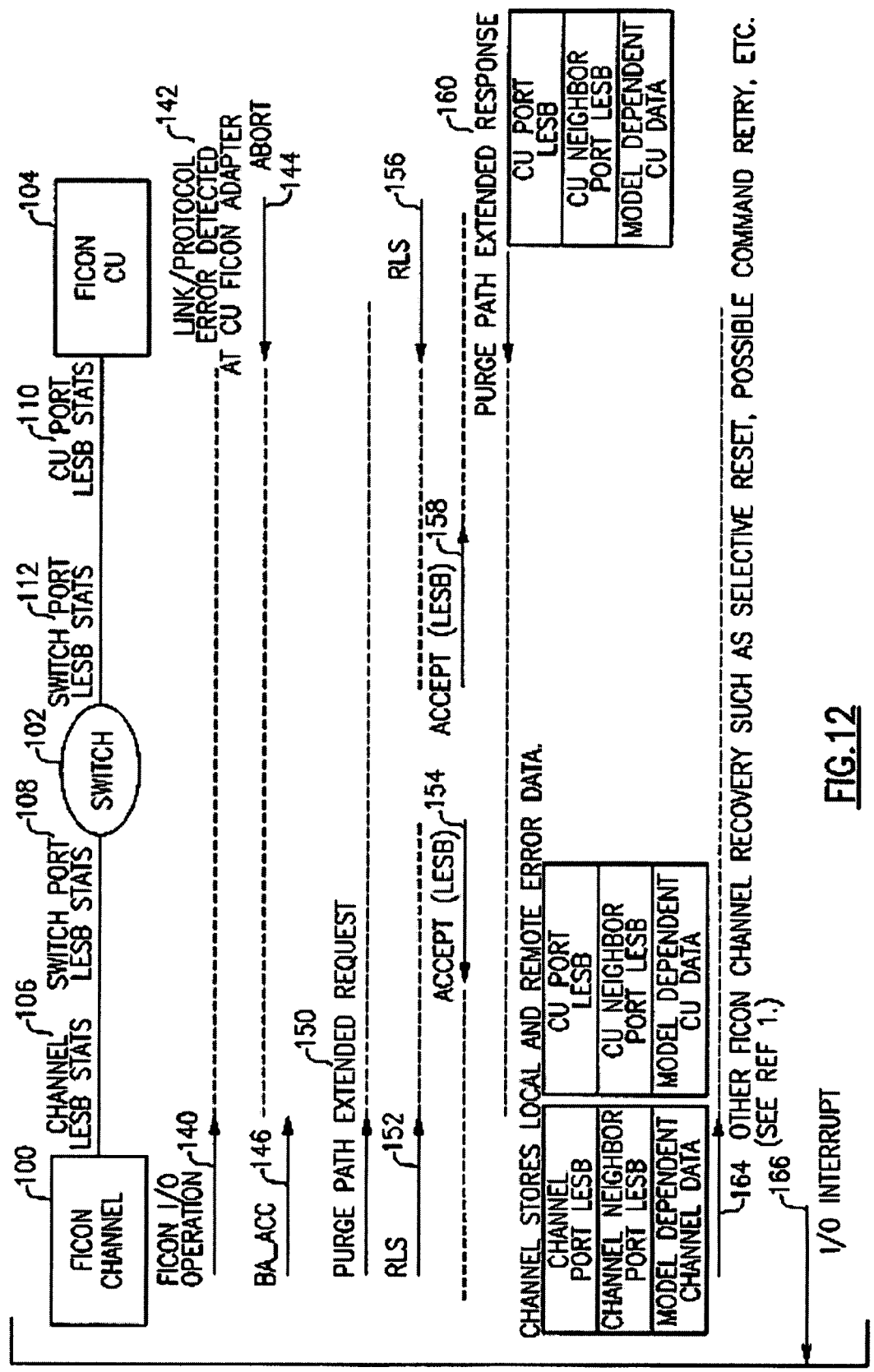
FIG. 12 is a diagram showing the operation of another embodiment of the Purge Page Extended facility of a Link/Protocol error detected at a Control Unit FICON adapter.

FIG. 12 is similar to FIG. 11, wherein similar elements of the FICON I/O system have the same numbers. In FIG. 12, FICON I/O operations are carried out at 140 until an link/protocol error 142 is detected at the Cu FICON adapter 104. In this case, an Abort 144 is sent by the CU 104 to the channel 100. The channel 100 then sends a BA_ACC 146. The channel 100 then sends an PPE request 150. From this point on, the process is the same as that described in FIG. 11. The channel 100 sends RLS 152 and accepts LESB 154. The CU 104 sends RLS 156 and accepts LESB 15B. The CU then sends its error data including statistics by PPE response 160 to the channel 100. At 162, the channel 100 stores the data it has collected and the data from the PPE response. The channel 100 then conducts other FICON channel recovery at 164, and then sends and I/O interrupt 166, as discussed in connection with FIG. 11.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method in a computer I/O system having a channel in network communications with a control unit, the method comprising:
   initiating by the channel, an I/O operation to the control unit;
   detecting by the channel, a link/protocol error in a link between the channel and the control unit;
   gathering by the channel, error data about the link/protocol error;
   receiving by the channel, error data about the link/protocol error gathered in the control unit;
   retrying the I/O operation one or more times; and
   making the error data received from the control unit and gathered by the channel available to a host computer for analysis.

2. The method according to claim 1, wherein the error data gathered in the channel include port error data from a port connecting the channel to the network.

3. The method according to claim 1, wherein the error data gathered in the control unit includes port error data from a port connecting the control unit to the network.

4. The method according to claim 1, wherein the channel comprises a Purge Path Extended (PPE) facility further comprising:
   receiving by the channel, error data about the link/protocol error gathered in the control unit;
   transmitting a PPE request via said network to the control unit when a transmission error is detected, the PPE request for error data about the link/protocol, error gathered in the control unit; and
   storing in said PPE facility error data accepted in response to said PPE request; and
   said PPE facility further providing an I/O interrupt to the host computer making available to the host computer error data about the link/protocol error in said storage.

5. The method according to claim 4, further comprising:
   if the network comprises a fabric, said PPE facility sending a Read Link Status (RLS) request to the channel neighbor port requesting error data about the link/protocol error kept by the channel neighbor port;
   receiving by the channel, Link Error Status Block (LESB) data sent by the channel neighbor port in response to said RLS request; and
   said PPE facility further accepting error data from the fabric sent in response to said PPE request;
   storing in said PPE facility, error data accepted in response to said RLS request and said PPE request;
   said PPE facility further providing an I/O interrupt to the host computer making available to the host computer error data in said storage.

6. The method according to claim 4, wherein said PPE request includes a reason code for the detected transmission error.

7. The method according to claim 4, wherein said PPE facility accepts and stores LESB data from the channel port.

8. The method according to claim 4, wherein said PPE facility accepts and stores model dependent error data from the channel.

9. The method according to claim 4, wherein said PPE facility accepts and stores Link Error Status Block (LESB) data and model dependent data transmitted from the control unit to the channel responsive to said PPE request.

10. A channel in a computer I/O system adapted to communicate with a control unit by way of a network, wherein the channel is configured to perform a method comprising:
    initiating by the channel, an I/O operation to the control unit;
    detecting by the channel, a link/protocol error in a link between the channel and the control unit;
    gathering by the channel, error data about the link/protocol error;
    receiving by the channel, error data about the link/protocol error gathered in the control unit;
    retrying the I/O operation one or more times; and
    making the error data received from the control unit and gathered by the channel available to a host computer for analysis.

11. The channel according to claim 10, wherein the error data gathered in the channel include port error data from a port connecting the channel to the network.

12. The channel according to claim 10, wherein the error data gathered in the control unit includes port error data from a port connecting the control unit to the network.

13. The channel according to claim 10, wherein the channel comprises a Purge Path Extended (PPE) facility further comprising:

receiving by the channel, error data about the link/protocol error gathered in the control unit;

transmitting a PPE request via said network to the control unit when a transmission error is detected, the PPE request for error data about the link/protocol error gathered in the control unit; and storing in said PPE facility error data accepted in response to said PPE request; and said PPE facility further providing an I/O interrupt to the host computer making available to the host computer error data about the link/protocol error in said storage.

14. The channel according to claim 13, further comprising:

if the network comprises a fabric, said PPE facility sending a Read Link Status (RLS) request to the channel neighbor port requesting error data about the link/protocol error kept by the channel neighbor port;

receiving by the channel, Link Error Status Block (LESB) data sent by the channel neighbor port in response to said RLS request; and said PPE facility further accepting error data from the fabric sent in response to said PPE request;

storing in said PPE facility, error data accepted in response to said RLS request and said PPE request;

said PPE facility further providing an I/O interrupt to the host computer making available to the host computer error data in said storage.

15. The channel according to claim 13, wherein said PPE request includes a reason code for the detected transmission error.

16. The channel according to claim 13, wherein said PPE facility accepts and stores LESB data from the channel port.

17. The channel according to claim 13, wherein said PPE facility accepts and stores model dependent error data from the channel.

18. The channel according to claim 13, wherein said PPE facility accepts and stores Link Error Status Block (LESB) data and model dependent data transmitted from the control unit to the channel responsive to said PPE request.

* * * * *